United States Patent
Nordeen (10) Patent No.: US 8,146,371 B2
(45) Date of Patent: Apr. 3, 2012

(54) DIRECT INDUCTION COMBUSTOR/GENERATOR

(75) Inventor: Craig A. Nordeen, Manchester, CT (US)

(73) Assignee: United Technologies Corporation, Hartford, CT (US)

(*) Notice: Subject to any disclaimer, the term of this patent is extended or adjusted under 35 U.S.C. 154(b) by 1256 days.

(21) Appl. No.: 12/004,660

(22) Filed: Dec. 21, 2007

(65) Prior Publication Data
US 2009/0158748 A1    Jun. 25, 2009

(51) Int. Cl.
  F02C 5/00    (2006.01)
  F02C 6/00    (2006.01)
  H02N 3/00    (2006.01)

(52) U.S. Cl. .................. 60/801; 60/39.76; 310/10

(58) Field of Classification Search .......... 60/39.76, 60/801; 310/10, 11
See application file for complete search history.

(56) References Cited

U.S. PATENT DOCUMENTS

| | | | | |
|---|---|---|---|---|
| 3,156,433 | A | * | 11/1964 | White, Jr. .................. 244/158.1 |
| 3,176,169 | A | * | 3/1965 | Neitzel .......................... 310/11 |
| 3,336,754 | A | | 8/1967 | Lange et al. |
| 3,348,079 | A | * | 10/1967 | McKinnon ..................... 310/11 |
| 3,368,088 | A | * | 2/1968 | Krzycki et al. ................ 310/11 |
| 3,616,056 | A | * | 10/1971 | Sims ....................... 156/379.8 |
| 3,777,487 | A | | 12/1973 | Norman et al. |
| 3,777,488 | A | | 12/1973 | Gross et al. |
| 3,954,380 | A | | 5/1976 | Valaev et al. |
| 4,268,765 | A | * | 5/1981 | Hoover, Jr. ..................... 310/11 |
| 6,349,538 | B1 | | 2/2002 | Hunter, Jr. et al. |
| 6,442,930 | B1 | | 9/2002 | Johnson et al. |
| 6,484,492 | B2 | * | 11/2002 | Meholic et al. ................. 60/247 |
| 6,550,235 | B2 | | 4/2003 | Johnson et al. |
| 6,666,018 | B2 | | 12/2003 | Butler et al. |
| 6,964,171 | B2 | | 11/2005 | Li et al. |
| 7,047,724 | B2 | | 5/2006 | Nordeen et al. |
| 7,669,405 | B2 | * | 3/2010 | Pinard et al. .................... 60/247 |
| 2004/0123583 | A1 | | 7/2004 | Nordeen et al. |
| 2005/0284127 | A1 | | 12/2005 | Tobita et al. |
| 2006/0096293 | A1 | | 5/2006 | Norris et al. |
| 2006/0213201 | A1 | | 9/2006 | Lupkes et al. |
| 2006/0216662 | A1 | | 9/2006 | Lupkes et al. |

OTHER PUBLICATIONS

Kuo, Kenneth Kuan-yun, *Principles of Combustion*, Chapter 4: "Detonation and Deflagration Waves of Premixed Gases". John Wiley & Sons, New York, 1986.

Litchford, R.J., "Integrated Pulse Detonation Propulsion and Magnetohydrodynamic Power", *NASA/TP*—2001-210801, Marshall Space Flight Center, Jan. 2001.

Paxson, Daniel E., "Optimal Area Profiles for Ideal Single Nozzle Air-Breathing Pulse Detonation Engines", *NASA/TM*—2003-212496, AIAA-2003-4512, Glenn Research Center, Jul. 2003.

(Continued)

*Primary Examiner* — Ehud Gartenberg
*Assistant Examiner* — Arun Goyal
(74) *Attorney, Agent, or Firm* — Kinney & Lange, P.A.

(57) ABSTRACT

A combustor/coil assembly for direct electromagnetic induction from a detonation wave comprises an annular combustor, a magnetic field source and a port. The annular combustor comprises an inner liner and a coaxial outer liner. The outer liner is electrically insulated from the inner liner. The magnetic field source generates a substantially axial magnetic field inside the annular combustor. The port introduces reactants into the annular combustor to form the detonation wave. The detonation wave induces a voltage between the inner liner and the outer liner by forming a current loop between the inner liner and the outer liner.

20 Claims, 3 Drawing Sheets

OTHER PUBLICATIONS

Henrick, Andrew K., Aslam, Tariq D. and Powers, Joseph M., "Highly Accurate Numerical Simulations of Pulsating One-Dimensional Detonations", American Institute of Aeronautics and Astronautics Paper 2005-1311, *43rd AIAA Aerospace Sciences Meeting and Exhibit*, Jan. 10-13, 2005.

Stewart, D. Scott and Kasimov, Aslan R., "State of Detonation Stability Theory and Its Application to Propulsion", *Journal of Propulsion and Power*, vol. 22, No. 6, Nov./Dec. 2006, 1230-1244.

\* cited by examiner

DIRECT INDUCTION COMBUSTOR/GENERATOR

BACKGROUND OF THE INVENTION

This invention relates to the generation of electric power, and specifically to direct power generation by inducing a Faraday voltage in a propagating detonation wave. In particular, the invention concerns a combustor/coil assembly for direct Faraday induction from magnetohydrodynamic (MHD) interactions between a detonation wave and an applied magnetic field.

Electric generators traditionally require three elements: a source of magnetic field, a Faraday loop or induction coil, and an engine or other source of mechanical energy to rotate the loop with respect to the field (alternatively, to rotate the field source with respect to the loop). Relative motion of the loop and coil results in a time rate of change in the magnetic flux. The changing magnetic flux results in an induced voltage or EMF (electromotive force), which can be used to drive current through a load.

The induced EMF is determined from Faraday's law:

$$\int_C E \cdot dl = -\frac{d}{dt} \int_S B \cdot dA. \qquad [1]$$

In EQ. 1, the left-hand integral is a closed-contour integral of the induced electric field E over Faraday loop l. This gives the EMF, or induced voltage V. The right-hand integral is performed over any surface A bounded by the Faraday loop (l), and gives the total magnetic flux through the loop ($\Phi$).

Faraday's law relates the induced EMF to the time rate of change in the magnetic flux through the loop; that is, $$V = -\frac{d\Phi}{dt}. \qquad [2]$$

The induced voltage (V) depends upon the strength of the magnetic field, and the geometry, orientation, and relative motion of the Faraday loop with respect to the field.

Magnetic field sources typically employ a combination of permanent magnets and field coils to generate the magnetic field. Permanent magnets are characterized by intrinsic magnetic fields, while field coils (or electromagnets) generate the magnetic field in response to an energizing current.

In one configuration the energizing current is fixed (or only permanent magnets used), so that the field is substantially constant in time. In this configuration, the flux ($\Phi$) varies sinusoidally in time, reflecting the rotating orientation of the coil with respect to the field. The result is a sinusoidal induced voltage, which characterizes an alternating current or AC electric power generator. In the simplest power generation geometry, the alternating frequency is determined by the rotational frequency of the coil, which is typically regulated to approximately 3,000 rpm or 3,600 rpm, in order to generate AC power with a standard frequency of fifty hertz (50 Hz) or sixty hertz (60 Hz).

In other configurations the energizing current also varies in time. In these configurations the generated power is either AC power or DC power, depending upon the relative phase of the energizing current and the rotation. In some of these configurations, for example, a commutator is used to generate DC electrical power. In others, multiple-phase coils are utilized to generate three-phase power or other, more general power waveforms.

The power delivered by the generator depends upon the load, which determines the current. The current is given by Ohm's law:

$$V = IZ, \qquad [3]$$

where Z is the impedance. For simple resistive loads Z=R, where resistance R has scalar form and current I is in phase with voltage V. In the more general case impedance Z has a complex phasor form to account for capacitive and inductive reactance, and the voltage and current are out of phase. In this generalized case, the average power output is $$\langle P \rangle = IV \cos \phi, \qquad [4]$$

where power factor $\phi$ accounts for the difference in phase (equivalently, the instantaneous power is averaged over a number of cycles).

Industrial generators and generators for aviation applications are typically powered by gas turbine engines. A gas turbine engine includes a compressor, a combustor, and a turbine, arranged in flow series with an upstream inlet and a downstream exhaust system. The compressor performs as a supercharger for the combustor, where the compressed air is mixed with fuel and ignited. Hot combustion gases exit the combustor into the turbine, where mechanical energy is extracted via a shaft which drives the compressor and a generator or other mechanical load.

Modern gas turbine engines are reliable, efficient sources of mechanical energy. They are also complex systems, with a large number of service-limited wear parts. The gas turbine engine's relatively large size and weight envelope is also a concern, particularly in aviation and aerospace applications. The result is a constant tradeoff among efficiency, weight, and reliability.

The thermodynamic efficiency of a gas turbine engine (or any engine) is limited by entropy considerations, as embodied in the Second Law of Thermodynamics. Specifically, the thermodynamic efficiency ($\eta$) is limited by $$\eta \leq \frac{T_H - T_L}{T_H}, \qquad [5]$$

where $T_H$ is the (relatively high) temperature at which energy is extracted from the combustion gas, and $T_L$ is the (relatively low) temperature of the exhaust. Because exhaust temperature $T_L$ is limited by ambient environmental conditions, improving the thermodynamic efficiency requires increasing combustion temperature $T_H$. This in turn increases the thermal load on service-limited parts, particularly in the combustor and turbine sections.

Gains in traditional turbine-based generator efficiency are thus typically offset by reductions in service life, or require heavier, more durable parts, which increase the weight and size envelope. There remains, therefore, an ongoing need for thermodynamically efficient electric generator systems with relatively fewer service-limited wear parts, lower weight and size requirements, and adaptability to both ground-based and aviation/aerospace applications.

BRIEF SUMMARY OF THE INVENTION

The present invention relates to a combustor/coil assembly for a direct power generation system. The assembly includes an annular combustor comprising coaxial, electrically isolated inner and outer combustor liners, and a magnetic field source. The field source comprises an electromagnetic coil or permanent magnet, or a combination thereof, for generating a toroidal magnetic field that is substantially axial inside the combustor.

Reactants such as fuel/oxidant mixture are introduced into the combustor via a port or ports. The reactants undergo an approximately constant-volume exothermic reaction to form a detonation wave that propagates circumferentially around the combustor. The detonation wave is conducting, forming a current path between the inner and outer combustor liners.

The resulting Faraday loop induces an electromotive force as it propagates through the magnetic field. The combustor/coil assembly thus provides for direct electromagnetic induction from the detonation wave, and direct electric power generation that does not require the mechanically rotating parts characteristic of traditional generator designs.

DETAILED DESCRIPTION

Figure 1:
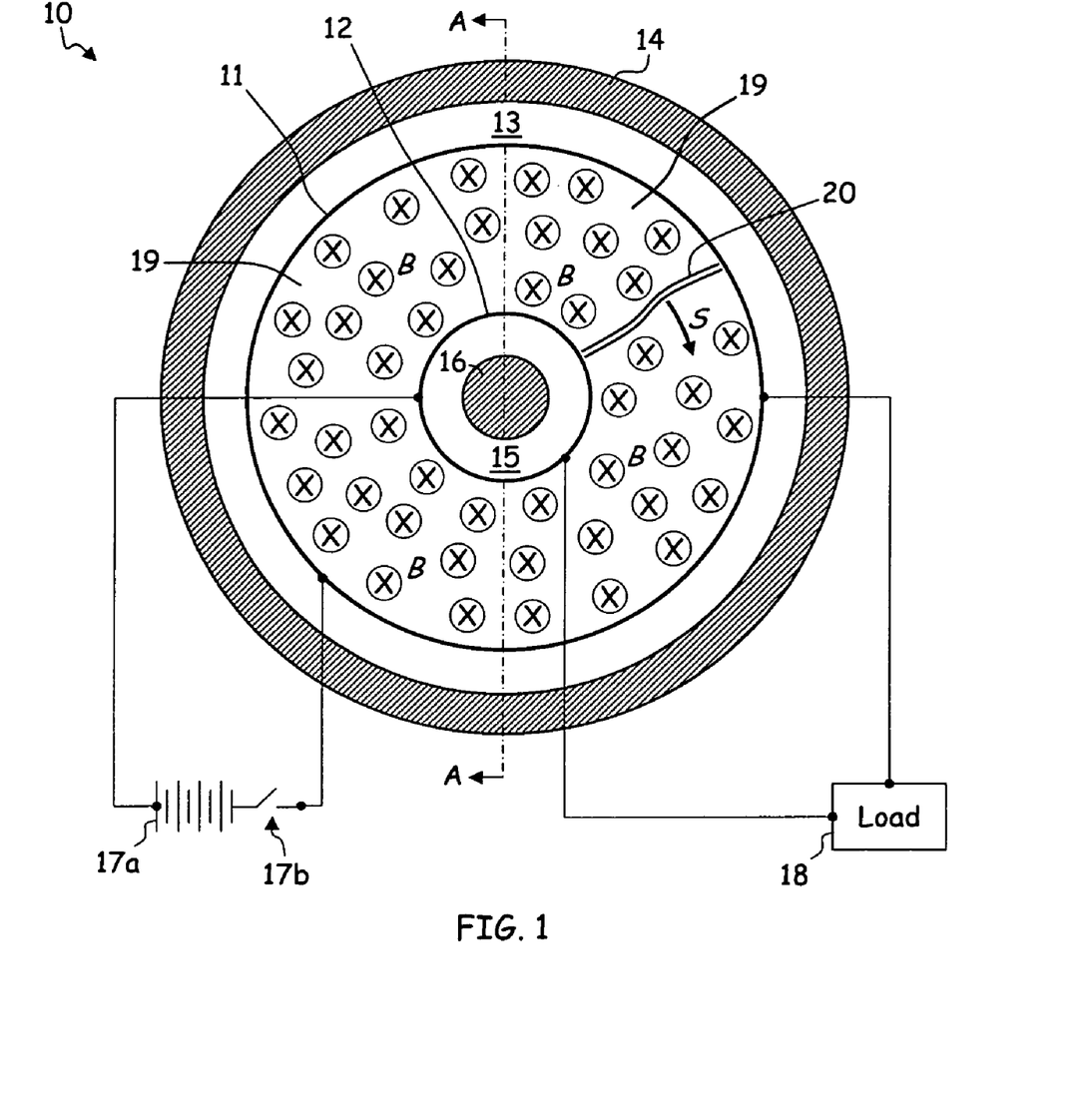
FIG. 1 is a front schematic view of a combustor/coil assembly for direct electromotive induction from a propagating detonation wave.

FIG. 1 is a front schematic view of combustor/coil assembly 10 for direct electromotive induction from propagating detonation wave 20. Assembly 10 comprises outside diameter (OD) combustor liner 11, inside diameter (ID) combustor liner 12, and a magnetic field source comprising at least one of OD coil 13 with OD flux return 14, and ID coil 15 with ID flux return 16. In the particular embodiment of FIG. 1, assembly 10 also comprises initiator 17 and load 18.

OD liner 11 and ID liner 12 are representative combustor liner elements, with OD liner 11 (the outer liner) coaxially mounted about ID liner 12 (the inner liner) to form annular combustion chamber 19. In some embodiments, OD liner 11 and ID liner 12 comprise single-walled combustor liner elements. In other embodiments, OD liner 11 and ID liner 12 comprise a number of combustor liners, combustor walls, plates, flow sleeves, combustor casings, or combinations thereof, in single-walled, double-walled, or other configurations.

OD liner 11 and ID liner 12 are manufactured from a high-temperature, oxidation-resistant material that is conducting and substantially nonmagnetic, such as a nickel-based or cobalt-based superalloy. In contrast to previous designs, OD liner 11 and ID liner 12 are electrically insulated from one another, such that there is no significant physical current path between OD 11 and ID liner 12, except via load 18. This allows OD liner 11 and ID liner 12 to function as elements of a Faraday loop, which is closed by detonation wave 20 as discussed below.

In typical embodiments, one or both of OD liner 11 and ID liner 12 are provided with a protective environmental coating including, but not limited to, an aluminide coating, a bond coat, a NiCrAlY (Nickel-Chromium-Aluminum-Yttrium) coating, a ceramic coating, a thermal barrier coating, or a composite or multilayer coating formed from a combination thereof. In further embodiments, one or both of OD liner 11 and ID liner 12 are provided with holes, slots or apertures in order to effectuate a cooling process such as film cooling, effusion cooling or impingement cooling.

In some embodiments, initiator 17 provides an initial ionizing voltage across OD liner 11 and ID liner 12, in order to facilitate formation of a partially ionized conducting path along detonation wave 20. In these embodiments, initiator 17 typically comprises high voltage (HV) supply 17a and switch 17b, where the HV supply provides sufficient voltage to partially ionize reactants, combustion/detonation products, or other components along detonation wave 20. Typically, initiator 17 is timed, such that the Faraday loop is formed with a particular phase relationship to other power generation processes, such as the phase of an alternating magnetic field, the phase of the load, or, in multiple-wave harmonic embodiments, the phase of other detonation waves co-propagating inside combustor 19.

In some embodiments, initiator 17 provides sufficient potential to generate a spark across OD liner 11 and ID liner 12, and functions as a dual initiator/igniter for assembly 10. In other embodiments, ignition is provided by an independent device such as a spark plug, glow plug, or spark igniter. In further embodiments, the reactants do not require timed ignition, but spontaneously react, ignite, or detonate to form detonation wave 20. This includes some continuous-wave embodiments, in which detonation wave 20 continuously propagates around combustor 19.

Load 18 is a representative power load for extracting electrical energy from combustor/coil assembly 10. Load 18 represents one or more of a test load, a transformer, a capacitive or electrochemical storage device, or an electrical connection to a local power distribution system or power grid.

Magnetic field B is generated inside annular combustor 19 via one or both of OD coil 13 (the outer diameter coil) and ID coil 15 (the inner diameter coil). In some embodiments, coils 13 and 15 comprise an electromagnetic coil for generating the magnetic field in response to an energizing current. In other embodiments, coils 13 and 15 comprise a permanent magnet that provides the field, or a permanent magnet that initiates a self-sustaining induced field.

In the embodiment of FIG. 1, coils 13 and 15 exhibit a cylindrical or toroidal geometry, in which a conduction element (e.g., a wire) is helically or spirally wound around a hollow mandrel or core to generate a solenoidal field when energized. In other embodiments, one or both of OD coil 13 and ID coil 15 is a bifilar or multifilar coil with two or more independent windings.

As shown in FIG. 1, outer coil 13 and inner coil 15 are coaxially arranged proximate OD liner 11 and ID liner 12, respectively. In other embodiments the coils are spaced from the combustor liners, either by insulating materials or by insulating or cooling gaps, in order to reduce heat transfer from combustor 19. In further embodiments, coils 13 and 15 utilize additional cooling holes, cooling passages, cooling circuits, or radiative elements in order to reduce the operating temperature of the coils.

In the embodiment of FIG. 1, coils 13 and 15 are each single-phase, single-wound coils that generate a substantially constant toroidal dipole field in response to a DC energizing current. In this embodiment, magnetic field B is toroidal, and substantially axial and homogeneous inside annular combustor 19. This distinguishes from other, more traditional configurations, in which the coils are oriented perpendicularly to a rotational axis.

As shown in FIG. 1, magnetic field B is directed into the plane of the figure. In other embodiments, the energizing current direction is reversed, and the field is directed out of the plane. Alternatively, an AC energizing current is utilized, and the field direction oscillates in time. In some of these embodiments, one or both of coils 13, 15 is a multiphase or multiple-winding coil, or the coils employ a commutator or other switching device to periodically reverse (or alternate) the field direction.

OD flux return 14 and ID flux return 16 provide magnetic flux return paths for OD coil 13 and ID coil 15, respectively. In typical embodiments, flux returns 14, 16 are formed from a magnetically soft material, in order to increase magnetic flux density inside annular combustor 19 and decrease fringing field density outside combustor/coil assembly 10.

The OD and ID flux returns typically comprise toroidal and cylindrical elements that are coaxially oriented with respect to OD coil 13 and ID coil 15, respectively. In some embodiments, the flux returns comprise D-shaped, U-shaped, or other yoke structures, and are designed for both flux return and structural functionality. In further embodiments, flux returns 14 and 16 are absent, such that the magnetic flux returns via an open path.

A fuel/oxidant or other reactant mixture is provided within combustor 19 via fuel/oxidant ports or other structures. The reactants generate detonation wave 20, as described below. Detonation wave 20 is a region of rapid exothermic reaction at approximately constant volume. The reaction generates sufficient thermal energy to partially ionize the reactants or reaction products (that is, fluid components within combustor 19), in order to create a conducting path between OD liner 11 and ID liner 12. This distinguishes from a traditional combustion wave or deflagration wave, because combustion is substantially supersonic, rather than subsonic.

Detonation wave 20 thus functions as a virtual wire, creating a Faraday current loop through OD liner 11 and ID liner 12 (and, when present, load 18). As detonation wave 20 propagates around annular combustor 19, it induces an EMF in proportion to the time rate of change in magnetic flux due to field B. The induced EMF (or voltage) depends upon the field strength, propagation velocity S, and the orientation of the field with respect to the Faraday loop. For alternating-field embodiments, the voltage also depends upon the phase of the energizing current, with respect to the rotational phase of detonation wave 20.

The induced voltage generates a Faraday current through OD liner 11, ID liner 12 and load 18, and the load extracts electrical energy from the current. Thus combustor/coil assembly 10 functions as a direct electromagnetic inductor or direct electric power generator, in which detonation wave 20 replaces the rotating components of traditional designs. More specifically, assembly 10 generates electrical power directly from detonation wave 20, without requiring downstream turbine or other mechanically rotating components.

In one particular embodiment of combustor/coil assembly 10, OD liner 11 has a diameter of approximately sixty centimeters (60 cm, or about 24 inches), and detonation wave 20 is a continuous detonation wave (CDW) propagating with supersonic velocity S of approximately two thousand meters per second (2,000 m/s, or about 4,500 mph). In this embodiment, detonation wave 20 has a Mach number of approximately four or greater, and propagates around annular combustor 19 at a rate of approximately one thousand hertz (1 kHz) or more. With the proper configuration of coils 13, 15, this allows combustor/coil assembly 10 to directly generate AC power in the kilohertz range, without the need for gearing assemblies or additional power processing or power conditioning circuitry.

In other embodiments, the dimensions of assembly 10 vary, along with the thermodynamic properties and propagation velocity of detonation wave 20. In some of these embodiments, combustor/coil assembly 10 utilizes a multiple-wave configuration in which a number of discrete detonation waves 20 co-propagate within annular combustor 19. In these embodiments, the wave frequency is a harmonic of the individual propagation frequency. Typically the harmonic is prime, due to the inherent stability of prime-numbered wave configurations, but assembly 10 is not limited to prime-numbered harmonics.

Figure 2:
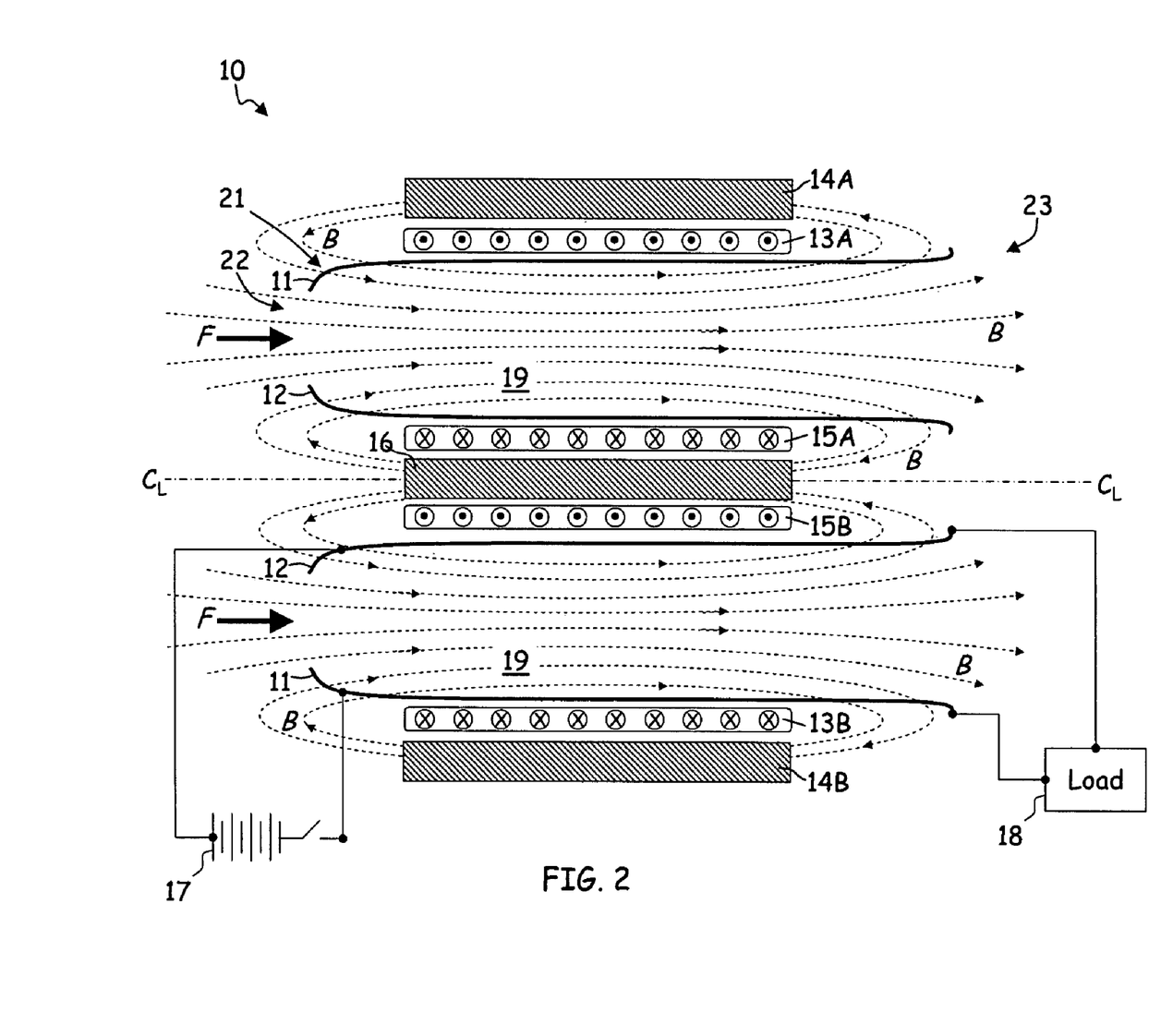
FIG. 2 is a cross-sectional schematic of the combustor/coil assembly in FIG. 1, taken along line A-A.

FIG. 2 is a cross-sectional schematic of combustor/coil assembly 10, taken along line A-A in FIG. 1. In this embodiment, assembly 10 comprises OD liner 11, ID liner 12, OD coil 13A (upper section) and 13B (lower section), OD flux return 14A (upper) and 14B (lower), ID coil 15A (upper) and 15B (lower), ID return 16, initiator 17 and load 18.

OD liner 11 is coaxially mounted with respect to ID liner 12, forming annular combustor 19 with upper and lower sections oriented about axial centerline $C_L$. The inner and outer coils (OD coil sections 13A, 13B and ID coil sections 15A, 15B), the flux returns (OD return sections 14A, 14B and ID return 16) exhibit a coaxial configuration with respect to the annular combustor, corresponding to the annular or circular cross sections of OD coil 13, OD return 14, ID coil 15 and ID return 16, respectively, as shown in FIG. 1.

With respect to the plane of FIG. 2, energizing current flows outward in upper OD coil section 13A (at the top of the figure), inward in upper ID coil section 15A, outward in bottom ID coil section 15B, and inward (down) in bottom OD coil section 13B. In this illustrative representation the inner and outer coils are in phase, and magnetic field B (shown in dashed lines) has a toroidal configuration that is substantially axial within annular combustor 19.

In the cross sectional illustration of FIG. 2, magnetic field B appears as a dual solenoidal field, oriented respectively about the upper and lower section of annular combustor 19. This interpretation is, however, limited by the two-dimensional representation of the figure. The full three-dimensional field has a toroidal structure, rather than a solenoidal structure, as generated by rotating FIG. 2 about axial centerline CL. Moreover, note that the energizing current flowing out of upper OD coil section 13A returns via lower OD coil section 13B, not upper ID coil section 15A; similarly, the energizing current flowing out of lower ID coil section 15B returns via upper ID coil section 15A, not lower OD coil section 13B.

Reactants such as a fuel/oxidant mixture are provided to dome section 21 of annular combustor 19 via fuel/oxidant or reactant port 22. As shown in FIG. 2, port 22 comprises an annular inlet disposed in dome 21 between OD liner 11 and ID liner 12, and the reactants are admitted with substantially axial flow as indicated by flow arrows F. This configuration is appropriate to embodiments in which air is utilized as an oxidant, and the air (or air/fuel mixture) in introduced through a region of choke flow, as achieved by an upstream compressor or by a ramjet-type intake.

Alternatively, reactants are admitted via a series of individual fuel/air ports 22. Individual ports 22 are distributed either circumferentially, about the upstream end of dome 21, or they extend more generally through a flame holder region of dome 21, including downstream regions of OD liner 11 or ID liner 12. In some of these embodiments, ports 22 comprise independent structures for admitting different reactants, such as oxidant apertures for air or oxygen, and fuel injector ports for admitting fuel. In further embodiments, ports 22 comprise swirlers to enhance reactant mixing.

The reactants generate a detonation wave by undergoing an approximately stoichiometric, approximately constant-volume reaction within combustor 19. The reaction is exothermic, and provides sufficient energy to create a conduction path between OD liner 11 and ID liner 12. This creates a virtual Faraday loop that propagates through magnetic field B, such that assembly 10 performs as a direct electric power generator for load 18 as described above. Combustion/detonation gases or other products of the reaction exit annular combustor 19 at exit ring 23, or an analogous structure on the downstream end.

In general, the electromagnetic power generated by combustor/coil assembly 10 is limited by the fraction of reaction energy available for partially ionizing fluid components in detonation wave 20, as required to form a conducting segment of the Faraday loop. The partial ionization temperature is relatively high, so that the thermodynamic efficiency is also high, as discussed above with respect to EQS. 3 and 4 (the Second Law of Thermodynamics). Below the partial ionization temperature, however, the actual efficiency drops significantly, because energy limited at lower temperatures is not available for ionization, and thus does not contribute to the generation of electrical power.

In some embodiments, therefore, combustion/detonation gases or other products reach exit ring 23 with substantial thermal energy that has not been expended to generate electrical power. In these embodiments, the thermal energy is typically utilized for another purpose and combustor/coil assembly 10 functions as a direct power generation stage for supplemental, auxiliary, or "parasitic" power.

In some of these staged embodiments, exit ring 23 comprises or merges with a propulsion nozzle, and the combustion/detonation products are use to generate reactive thrust. In these embodiments, assembly 10 functions as a direct power stage for generating auxiliary power in a pulse jet engine, a ram jet engine, a scram jet engine, or a continuous detonation wave propulsion engine. In other embodiments, the exit ring comprises or merges with a transition piece or analogous structure, and the combustion/detonation products are used in a Brayton-cycle (turbine) engine. In these embodiments assembly 10 functions as a direct power stage for generating auxiliary or supplemental power in a turbofan engine, a turbojet engine, or a turboprop engine, or, alternatively, a direct power stage for generating primary or auxiliary power in a combined-cycle generator system. Alternatively, assembly 10 functions as a direct power generator for an engine utilizing a regenerative power cycle such as an Ericsson cycle or a direct power generator in a system that also provides thermal energy for an industrial process.

Figure 3:
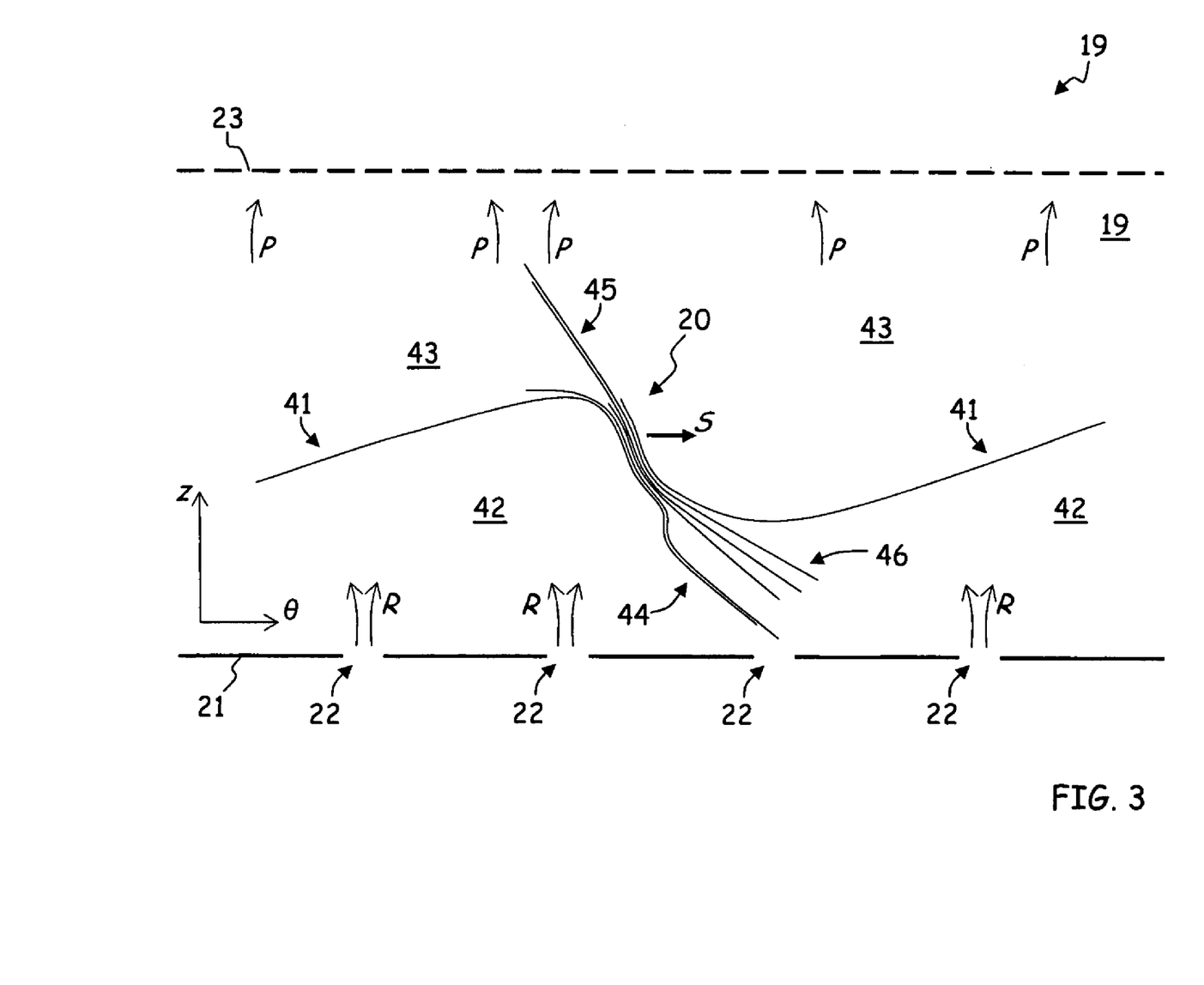
FIG. 3 is an "unwrapped" schematic of the combustor in FIG. 1, showing the propagating detonation wave.

FIG. 3 is an "unwrapped" schematic of combustor 19, showing propagating detonation wave 20. In FIG. 3 annular combustor 19 is unwrapped or "unrolled," such that the circumferential or tangential direction of propagation ($\theta$) is mapped to the horizontal axis. The axial direction (z) corresponds to the vertical axis, with dome 21 near the bottom of the figure and exit ring 23 (shown in phantom) near the top.

Reactants are introduced into combustor 19 via ports or apertures 22, which have a variety of configurations as described above. In the embodiment of FIG. 3, ports 22 are circumferentially spaced fuel/oxidant apertures and the reactant flow is substantially axial into annular combustor 19, as indicated by reactant flow arrows R. The magnetic field is also substantially axial, but is not shown in FIG. 3.

Flame front 41 defines the flame holder region of annular combustor 19, which divides the combustor into generally upstream reactant region 42, and generally downstream product region 43. Detonation wave 20 propagates circumferentially though combustor 19 along flame front 41, with left-to-right propagation velocity S corresponding to the clockwise direction illustrated in FIG. 1, above.

Detonation wave 20 comprises a region of rapid, high temperature, approximately stoichiometric and approximately constant-volume exothermic reaction. This distinguishes from the approximately constant-pressure combustion processes characteristic of traditional Brayton-cycle turbine engines and Otto- or Diesel-cycle piston engines, and from the approximately constant-temperature processes characteristic of Ericsson-cycle and other regenerative engines. In particular, the pressure and thermal gradients in detonation wave 20 are significantly higher than they are along a traditional combustion front, and are sufficient to partially ionize fluid components along the detonation wave, creating a conduction path that directly induces a Faraday voltage across combustor 19.

In one embodiment, detonation wave 20 is a continuous detonation wave that propagates around annular combustor 19 with a characteristic (periodic) cycle time. In this embodiment, detonation wave 20 is self-sustaining, and is continuously formed along flame front (detonation front) 41. This eliminates or reduces the need for repeated or pulsed deflagration-detonation (DDT) transitions, and associated turbulence-inducing flow structures. In some alternate embodiments, detonation wave 20 is a pulsed detonation wave. In these embodiments, detonation wave 20 is regenerated at periodic intervals via timed ignition. In further embodiments, detonation wave 20 represents a series of co-propagating harmonic waves, as described above. In additional embodiments, detonation wave 20 has some characteristic of a strong deflagration wave, but differs from a traditional combustion wave in that flame propagation front 41 is an electrically conductive front, in which the combustion/detonation reaction is at least partially transonic, rather than subsonic.

Moreover, detonation wave 20 propagates in a circumferential sense within combustor 19; that is, along flame front 41 (the $\theta$ direction), and perpendicular to the direction of axial flow (the +z direction). This further distinguishes from traditional designs, in which the flame front is held stationary with respect to dome 21 by balancing the downstream flow with the upstream flame propagation, and there is no circumferentially propagating detonation wave.

In typical embodiments, detonation wave 20 forms along an extremely rapid or explosive reaction region, and the relative propagation velocity S is transonic or supersonic. This is characterized, for example, by the Chapman-Jouguet velocity (the C-J velocity). Thus the approximately constant-volume process that forms detonation wave 20 is also characterized as an approximately C-J (Chapman-Jouguet) process. Note, however, that different regions of combustion wave 20 are capable of traveling at different velocities with respect to the combustor liners (for example, the wave region proximate the OD liner, where the circumference is greater, typically travels faster than the region proximate the ID liner, where the circumference is less). Note also that the C-J velocity depends upon the local pressure and temperature distribution, which requires a generalized three-dimensional analysis.

Where the local (relative) velocity along detonation wave 20 approaches or exceeds a Mach number of one, the detonation wave generates shock waves. As shown in FIG. 3, these typically include upstream shock (or shock wavefront) 44, upstream in reactant flow region 42, and downstream shock wave 45, propagating downstream in product flow region 43. For a range of transonic and supersonic propagation speeds, the flow field is also characterized by expansion wave 46, as formed between upstream shock wave 44 and flame front 41.

In traditional pulse jet designs, shock formation and the direction of propagation are controlled by a series of shutters or intake valves, which bias the momentum flow in a downstream sense in order to produce reactive thrust. FIG. 3 represents a valveless, shutterless configuration in which propagation velocity S is tangential, not axial, and is controlled by ignition timing and by magnetohydrodynamic interactions along detonation wave 20, rather than by mechanical flow-modifying structures.

In some embodiments, flame front 41 is substantially upstream of exit ring 23, and the shock wave structure shed by detonation wave 20 is substantially disrupted before the reaction products exit combustor 19. In these embodiments, reactants emerge from exit ring 23 with substantially axial flow, and are available as a thermal source for driving a gas turbine or other mechanical engine. In other embodiments, reactants emerge from exit ring 23 with a substantial non-uniform shock wave structure, and carry sufficient energy and momentum to generate reactive thrust in a pulse jet, ram jet, scram jet, or continuous detonation wave propulsion system.

FIGS. 1-3 illustrate a number of inherent advantages that are characteristic of the direct power generation techniques described here. Specifically, direct electromotive induction relies on magnetohydrodynamic interactions between the detonation wave and the magnetic field, and does not require the mechanically rotating elements that are characteristic of traditional designs. This dramatically reduces the number of moving parts required to generate electrical power, and significantly reduces the size and weight envelope of the generator.

The thermodynamic efficiency is also higher, because approximately constant-volume reactions are approximately non-expansive; that is, they provide more energy in thermal form, and less energy in mechanical form. Direct power generation also extracts energy at the peak reaction temperature, rather than in downstream regions where the reactants have expanded and cooled. This reduces the downstream cooling load by converting thermal energy directly to electrical power, without intermediate mechanical steps, and without the need for inefficient, bulky, and costly active cooling systems. The detonation wave also propagates at a much higher velocity than mechanically rotating generator components. This increases the time rate of change in the flux and induced EMF, and decreases the cycle period to approach the kilohertz range and above, without the need for either mechanical or electronic frequency-multiplying components.

The present invention has been described with reference to preferred embodiments. The terminology used is for the purposes of description, not limitation, and workers skilled in the art will recognize that changes may be made in form and detail without departing from the spirit and scope of the invention.

The invention claimed is:

1. An assembly comprising:
an annular combustor comprising an inner liner and an outer liner electrically insulated from the inner liner, the outer liner coaxially mounted about the inner liner;
a magnetic field source for generating a substantially axial magnetic field inside the annular combustor; and
a port for forming a flame front by introducing a fuel/air mixture into the annular combustor, the fuel/air mixture having axial flow;
wherein a detonation wave propagates continuously and circumferentially about the annular combustor through the magnetic field along the flame front; and
wherein the continuously and circumferentially propagating detonation wave induces a voltage between the inner liner and the outer liner by forming a current loop between the inner liner and the outer liner.

2. The assembly of claim 1, wherein the magnetic field source comprises a permanent magnet.

3. The assembly of claim 1, wherein the magnetic field source comprises an outer coil coaxially arranged about the outer liner.

4. The assembly of claim 3, further comprising an inner coil coaxially arranged within the inner liner.

5. The assembly of claim 3, wherein the magnetic field is an alternating magnetic field.

6. The assembly of claim 1, wherein the reactants form the continuously and circumferentially propagating detonation wave by reacting at approximately constant volume.

7. The assembly of claim 6, further comprising an exit ring on a downstream end of the annular combustor, the exit ring comprising a propulsion nozzle.

8. The assembly of claim 6, further comprising a compressor and a turbine in flow series with the annular combustor.

9. A direct electrical power generator comprising:
an inner combustor liner;
an outer combustor liner coaxially mounted about the inner combustor liner, wherein the outer combustor liner is electrically insulated from the inner combustor liner;
a magnetic field source for generating a substantially axial and toroidal magnetic field between the inner and outer combustor liners; and
a port for introducing a fuel/air mixture into an annular combustor, the fuel/air mixture having axial flow and forming a continuously propagating detonation wave along a frame front between the inner and outer combustor liners;
wherein the continuously propagating detonation wave generates electrical power by forming a conducting loop between the inner and outer combustor liners, and by propagating circumferentially about the annular combustor through the magnetic field to induce a voltage between the inner combustion liner and the outer combustor liner.

10. The generator of claim 9, wherein the continuously propagating detonation wave propagates circumferentially about the annular combustor at a supersonic velocity.

11. The generator of claim 9, wherein the continuously propagating detonation wave propagates circumferentially around the inner combustor liner at a frequency of approximately one kilohertz (1 kHz) or higher.

12. The generator of claim 9, wherein the fuel/air mixture form a series of co-propagating continuous detonation waves propagating circumferentially about the annular combustor.

13. The generator of claim 9, further comprising a propulsion nozzle on a downstream end of the annular combustor.

14. The generator of claim 13, wherein the generator functions as a direct power stage for a pulse jet engine.

15. The generator of claim 13, wherein the generator functions as a direct power stage for a ramjet engine.

16. The generator of claim 13, wherein the generator functions as a direct power stage for a scramjet engine.

17. The generator of claim 9, further comprising a compressor and a turbine, and wherein the generator is a direct power stage for a gas turbine engine.

18. A method of direct electrical power generation, the method comprising:
providing an axial magnetic field inside an annular combustor, the annular combustor comprising an outer combustor liner coaxially mounted about the inner combustor liner and electrically insulated from the inner combustor liner;
introducing a fuel/air mixture having axial flow into the annular combustor to form an electrically conducting detonation wave propagating continuously along a flame front between the inner combustion liner and the outer combustion liner, the detonation wave proceeding circumferentially about the annular combustor via an approximately constant-volume exothermic reaction; and generating electrical energy from a voltage induced by the continuously propagating detonation wave as it propagates circumferentially about the annular combustor through the magnetic field, wherein the continuously propagating detonation wave induces the voltage between the inner combustor liner and the outer combustor liner by forming a current loop between the inner combustor liner and the outer combustor liner.

19. The method of claim 18, wherein providing an axial magnetic field comprises energizing at least one of an inner coaxial coil and an outer coaxial coil.

20. The method of claim 18, further comprising utilizing additional thermal energy from the approximately constant-volume exothermic reaction for propulsion.

* * * * *